(12) United States Patent
Murphy et al.

(10) Patent No.: US 11,068,789 B2
(45) Date of Patent: Jul. 20, 2021

(54) DYNAMIC MODEL DATA FACILITY AND AUTOMATED OPERATIONAL MODEL BUILDING AND USAGE

(71) Applicant: Aha Analytics Software LLC, Chicago, IL (US)

(72) Inventors: Robert Craig Murphy, Denver, CO (US); Bruce Allen Bacon, Castle Rock, CO (US); Peter T. Gallanis, Highlands Ranch, CO (US); Mark Samuel Teflian, Parker, CO (US)

(73) Assignee: Aha Analytics Software LLC, Chicago, IL (US)

( * ) Notice: Subject to any disclaimer, the term of this patent is extended or adjusted under 35 U.S.C. 154(b) by 1354 days.

(21) Appl. No.: 15/083,014

(22) Filed: Mar. 28, 2016

(65) Prior Publication Data

US 2016/0210555 A1 Jul. 21, 2016

Related U.S. Application Data

(62) Division of application No. 14/060,820, filed on Oct. 23, 2013, now Pat. No. 10,896,374.

(60) Provisional application No. 61/740,257, filed on Dec. 20, 2012.

(51) Int. Cl.
*G06N 5/02* (2006.01)
*G06N 20/00* (2019.01)
*G06N 5/04* (2006.01)

(52) U.S. Cl.
CPC .............. *G06N 5/022* (2013.01); *G06N 5/04* (2013.01); *G06N 20/00* (2019.01)

(58) Field of Classification Search
CPC ........... G06N 5/022; G06N 5/04; G06N 20/00
See application file for complete search history.

(56) References Cited

U.S. PATENT DOCUMENTS

| | | |
|---|---|---|
| 5,129,037 A | 7/1992 | Kirk et al. |
| 7,630,986 B1 | 12/2009 | Herz et al. |
| 7,941,398 B2 | 5/2011 | Sichi et al. |
| 7,945,497 B2 | 5/2011 | Kenefick et al. |
| 2002/0174126 A1 | 11/2002 | Britton et al. |
| 2006/0136273 A1 | 6/2006 | Zizzamia et al. |

(Continued)

OTHER PUBLICATIONS

Bach et al, Paired Learners for Concept Drift (Year: 2008).*

(Continued)

*Primary Examiner* — Li B. Zhen
*Assistant Examiner* — Henry Nguyen
(74) *Attorney, Agent, or Firm* — Sheridan Ross P.C.

(57) ABSTRACT

A commercial process with a dependent variable can be associated with a set of independent variables. The commercial process can continuously provide data collection opportunities. An intervention is designed using a model to predict the dependent outcome. The actual outcome of the intervention can be determined within the window of utility for these data. One objective is to improve intervention outcomes with prediction. Purely random outcomes (no model prediction) and outcomes resulting from the intervention (model operations) are aggregated into separate files—a sequence of control model data files and a sequence of model data files of operational data. These model data files and control model data files are used to analyze model performance and to react automatically when identified conditions warrant.

9 Claims, 8 Drawing Sheets

(56) References Cited

U.S. PATENT DOCUMENTS

| | | | |
|---|---|---|---|
| 2008/0244251 A1* | 10/2008 | Fletcher | G06Q 10/04 713/1 |
| 2009/0106178 A1* | 4/2009 | Chu | G06N 20/00 706/14 |
| 2011/0137852 A1 | 6/2011 | Gajic et al. | |
| 2012/0041822 A1 | 2/2012 | Landry et al. | |
| 2012/0078712 A1 | 3/2012 | Fontana et al. | |
| 2012/0089626 A1 | 4/2012 | Goranson | |
| 2014/0095417 A1 | 4/2014 | Herz et al. | |
| 2014/0180982 A1 | 6/2014 | Murphy et al. | |
| 2016/0210554 A1 | 7/2016 | Murphy et al. | |

OTHER PUBLICATIONS

Nguyen et al. "Sense & Response Service Architecture (SARESA): An approach towards a Real-time Business Intelligence Solution and its use for a fraud Detection Application," DOLAP '05, Proceedings of the 8th ACM International Workshop on Data warehouse and OLAP, Nov. 2005, pp. 77-86.
Official Action for U.S. Appl. No. 14/060,820, dated Apr. 16, 2018 24 pages.
Eder et al. "Modeling Transformations between Versions of a Temporal Data Warehouse," Springer-Verlag Berlin Heidelberg, 2008, 10 pages.
Hunter et al. "PANIC: an integrated approach to the preservation of composite digital objects using Semantic Web services," International Journal on Digital Libraries, 2006, vol. 6, No. 2, pp. 174-183.
Rahman "Updating Data Warehouses with Temporal Data," Proceedings of the Fourteenth Americas Conference on Information Systems, Toronto, ON, Canada, Aug. 14-17, 2008, 9 pages.
International Search Report and Written Opinion for International (PCT) Patent Application No. PCT/US2013/066326, dated Apr. 16, 2014 8 pages.
Official Action for U.S. Appl. No. 14/060,820, dated Jul. 15, 2015 6 pages Restriction Requirement.
Official Action for U.S. Appl. No. 14/060,820, dated Mar. 11, 2016 10 pages.
Official Action for U.S. Appl. No. 14/060,820, dated Dec. 6, 2016 16 pages.
Official Action for U.S. Appl. No. 14/060,820, dated Aug. 11, 2017 16 pages.
Golab et al. "Stream Warehousing with DataDepot," Proceedings of the 2009 ACM SIGMOD International Conference on Management of data, Jun. 29-Jul. 2, 2009, pp. 847-854.
Guez et al. "Neural networks and fuzzy logic in clinical laboratory computing with application to integrated monitoring," Clinica Chimica Acta, 1996, vol. 248, pp. 73-90.
Official Action for U.S. Appl. No. 14/060,820, dated Jan. 31, 2019 19 pages.
Bellocchi et al. "Validation of biophysical models: issues and methodologies. A review," Agronomy for Sustainable Development, Mar. 2010, vol. 30, No. 1, pp. 109-130.
Cohen et al. "Real-time data mining of non-stationary data streams from sensor networks," Information Fusion, 2008, vol. 9, pp. 344-353.
Deslandres et al. "An expert system prototype assisting the statistical validation of simulation models." Simulation, Feb. 1991, vol. 56, No. 2, pp. 79-89.
Wang et al. "Hybrid Rule Ordering in Classification Association Rule Mining," Transactions on Machine Learning and Data Mining, 2008, vol. 1, No. 1, pp. 1-15.
Widmer et al. "Learning in the Presence of Concept Drift and Hidden Contexts," Machine Learning, 1996, vol. 23, pp. 69-101.
Official Action for U.S. Appl. No. 14/060,820, dated Nov. 15, 2019 19 pages.
Official Action for U.S. Appl. No. 14/060,820, dated May 7, 2020 26 pages.
Official Action for U.S. Appl. No. 14/060,820, dated Nov. 16, 2020 25 pages.
Notice of Allowance for U.S. Appl. No. 14/060,820, dated Dec. 9, 2020 11 pages.
Official Action for U.S. Appl. No. 15/082,988, dated Feb. 10, 2020 14 pages.
Official Action for U.S. Appl. No. 15/082,988, dated Nov. 20, 2020 15 pages.

* cited by examiner

DYNAMIC MODEL DATA FACILITY AND AUTOMATED OPERATIONAL MODEL BUILDING AND USAGE

CROSS-REFERENCE TO RELATED APPLICATIONS

This application is a division of U.S. patent application Ser. No. 14/060,820, filed Oct. 23, 2013, which claims the benefit of U.S. Provisional Application No. 61/740,257, filed Dec. 20, 2012, the entire disclosures of which are hereby incorporated herein by reference.

FIELD OF THE DISCLOSURE

The present disclosure is generally directed toward analytics and specifically toward business-embedded analytics systems and methods.

BACKGROUND

Business today operates in a dynamic and uncertain global environment. The flood of scattered, often random data that pours in each day compounds the complexity of business decision making. Business intelligence (BI) collects and structures that data, and data warehousing stores it, but currently BI solutions still fall short of successfully collecting and using the data and the business wisdom it contains to optimize business operations in a timely fashion.

Analytics provides the applications, techniques, and technologies for understanding performance drivers in an organization and for implementing fact-based, model-driven decision-making. Analytics focuses on extrapolating trends and making predictions and on enabling actionable insights that can drive decision-making.

An effective Operational Intelligence Platform is integrated throughout the enterprise to enable model-based decisions and connect business users at every level—strategic, tactical, and operational—with business data. To achieve its transformative potential, operational analytics must not be confined to power users but must be accessible to employees on the front lines who interact with customers and make operational decisions every day. In other words, operational analytics must be business-embedded.

While this potential is ignored by some 93 percent of businesses today, enterprises are recognizing that analytics will be the operational heart of a competitive and successful business in an interconnected world characterized by massive information access, a demanding customer base, scarcity of capital, shifting distribution channels, a mobile work force, and intense cost competition.

SUMMARY

It is one aspect of the present disclosure to provide a complete Operational Intelligence Platform. In particular, it is one aspect of the present disclosure to provide a dynamic model data facility. It is another aspect of the present disclosure to provide techniques, algorithms, systems, and operational data management artifacts for building, using, and updating such dynamic models to be operative and accurate on a business real-time basis while increasing data mining and predictive analysis professionals' productivity by an order of magnitude.

Dynamic Model Data Facility

Predictive analytics and operational models relies heavily on data being syntactically and semantically organized or structured in a manner that facilitates its use by statistical applications for predictive modeling and usage. In general, all data related to an entity is organized into a single row or observations with values occurring in specific columns. In order for the analytics to be effective, unlike many other organized files, the data is processed and produced so that it is not sparse and typically gives a historical view of the entity between instances of the data. The values within the rows contain a mix of instantaneous and cumulative amounts or counts of data. While dates may be useful, the information the date confers tends to be computed and placed into the file and along with values that represent counts and totals. For example, the number of months one has been a customer would be used instead of their signup date; the number of purchases made in the last 30, 60, and 90 days as three separate values; or the number of days since their last purchase.

In accordance with at least some embodiments, a model data file (MDF) is provided and mechanisms for generating such MDFs on a periodic basis (e.g., daily, weekly, monthly, etc.) with updates that have merged with the previous historical values are also provided.

In some embodiments, each file may be configured to provide a historical perspective of the entire set of entities and can be used to compare information across a timeline. The effort to construct these files requires incorporating and normalizing data from multiple sources in a complex process of Extract, Transform and Load (ETL) and entails not only a matter of joining values from different sources, but also aggregating values or counts across one or more periods (such as the purchases in the last N days example above). These ETL processes have historically been driven by a finite set of relatively static data sources and are usually flat file extracts. Because of the method of extraction, the transformations and loading tend to also be static and hence do not need to be flexible since the sources tend to remain static. This leads to the inability to detect and react quickly to new targets and predictors uncovered within the data.

The Dynamic Model Data Facility (DMDF), as disclosed herein, is designed to address a number of shortcomings that occur when using a traditional static MDF. These include flexible access to additional data sources and more timely access and manipulation of that data. When coupled with an automated updating process, new relationships may be discovered on the fly, new data elements can be evaluated on the fly, and target markets can be uncovered in an automated or semi-automated fashion.

In accordance with at least some embodiments, there are two components to the implementation of the DMDF. The first component corresponds to a data abstraction and access layer and the second component corresponds to a model data definition facility, or analytics meta-data.

Data Abstraction and Access Layer

The data abstraction and access layer, in some embodiments, takes advantage of the recent advances in Big Data concepts. Primarily, Big Data was previously considered as exhaust data and too voluminous to capture and evaluate. Embodiments of the present disclosure, however, enable the Big Data to be quickly acquired, categorized and saved in a high performance manner. Taking advantage of parallelized storage and analysis software (and accelerated with specialized hardware such as Field Programmable Gate Arrays or FPGA's); data can now be stored in a raw form and evaluated on the fly in a Create/Read mode (as opposed to the traditional Create/Read/Update/Delete (CRUD) style of access). Storing data in its raw form is extremely useful since the algorithms that may aggregate, match or combine may be refined as time progresses and saving such transformed values may lose any potential predictive value. For example, in a traditional approach, the data base for a social networking application may use CRUD utilities to keep track of the current location of a member.

For example, using a CRUD approach loses all information related to where a person was before and when they were there. Storing information related to each time the person changed locations as well as when they changed locations can open up a whole new set of analytics such as how often they move, as well as the impact it may have had on their relationship graphs. While traditional data bases and structure can be used to contain such log style of information, performance is usually coupled with indexes which can grow unbounded in size when large amounts of data are tracked and performance can deteriorate quickly.

Quick access to huge amounts of tagged unstructured data across a wide timeline provides the key for a successful dynamic construction of data for predictive modeling. However, the data in its raw form does not lend itself to a structure that facilitates the use of predictive analytics modeling and data mining tools. In accordance with at least some embodiments, data for each entity can be combined in a manner such that the information for that entity is conveyed in a single row. Additionally, the values do not have to be computed in a consistent manner as they are not all sums or simple counts, rather they can be summed and counted within a context such as new or within buckets or ranges.

Analytics Meta-Data

The second component to the DMDF is the analytics meta-data, or data about how the data for the analytics is to be constructed as well as information about the data itself (e.g., ranges, data types, etc.).

The analytics meta-data, in some embodiments, defines a number of key features which may include, but are not limited to the following: the source of the data (which may be from extracts of traditional systems such as customer relationship management (CRM) databases as well of the collected raw Big Data); the transformations that must be performed on that data; the relationship of one set of data to another (such as indirection for joining sets of data); and a selection criteria. In some embodiments, each meta-data definition identifies the process for constructing one or more values for a single row or observation. An MDF can be built on an ad-hoc basis using the most current data available at the time, addressing the second need of timeliness.

Of course, the creation of an MDF may specify that the meta-data be defined, and the meta-data is defined based on the definition of the predictive model which uses an MDF to construct the model. This conundrum is addressed using business analysis to identify the potential dependent variables and evaluating the potential independent variables on how the business users evaluate their success using a Key Performance Indicator (KPI) model building system. Initially, the approach used to build the first meta-data definitions to construct an MDF for the first generation of a predictive model of the dependent variable. This can be an iterative process where multiple buckets or different timelines are adjusted to understand the impact it has on the model outcomes. However, once developed and the independent variables are identified (perhaps along with the necessary transformations) the meta-data for construction of the MDF is defined and can now be used to construct the file for processing on an ad hoc or as needed basis.

This process of building an initial MDF from a variety of sources to evaluate against a dependent variable has a tremendous additional benefit. When used in a continuous and automated manner, new dependent variables may be considered to re-specify and build new models. When connected with other system components that are designed to monitor the flow and structure of data as it is processed by the data abstraction layer, potentially new and previously unconsidered relationships in data may be discovered that may provide new business value. Once the models have been validated and approved the meta-data for these MDFs can be added to the catalog of available MDF builders.

Automated Model Building and Usage

Consider the following scenario—one binary dependent variable and many independent variables exist from some commercial process wherein the dependent variable represents success and the independent variables are uniquely associated with the respective dependent outcome. Prediction consists of assigning a probability for the binary dependent variable in terms of a complete set of values for all independent variables. In accordance with at least some embodiments, the probability can calculated using "scoring code" produced from model building with observable values of the independent variables.

It is another aspect of the present disclosure to provide mechanisms for model building, model validation, ongoing model usage, and ongoing model validation, along with the methods of model retraining. It should be noted that retraining may comprise two distinct forms, re-calibration of the operative model (e.g., updating the model's coefficients with the latest data) and re-specification of the model itself (e.g., creating an entirely new model by re-running feature creation and feature selection over the latest data). The former is faster and cheaper but potentially less effective in the event of non-stationary independent variables.

The DMDF as disclosed herein can be continuously updated to create variables for consideration by predictive modeling systems to ongoing commerce with continuous testing for stationarity and stability. Responsive interactions between the two expert systems may require data that be timely, accurate and of sufficient size for automated operational modeling to succeed.

In accordance with at least some embodiments, a model built with initial data can be reiteratively retrained when significant deviations from the original training and/or validation MDF are measured in the ongoing operations. Both the initial training and validation data (MDFs) can be of the same vintage, existing in one system before the model is operationalized in the training and validation system. In some embodiments, the data used to estimate ongoing deviations are collected during operations and are independent of the initial training and validation data.

This implies that the training and validation system, with its model prediction mechanism embedded, has the capability to capture actual user outcomes continuously. The deviations governing retraining decisions can be decided by comparing ongoing model operation to the original training and validation data. Four distinct data sets, (e.g., in the form and function of MDFs) can be used to this end: the original training data; the original validation data; the ongoing operational data with outcomes; and an ongoing set of data not used in the operational model (e.g., a random set that is withheld for control purposes).

In some embodiments, the input to model building is the initial MDF with its columns of dependent and independent variables and rows of observations associated with a customer or business-related instance. One dependent variable means one model. The interface out of model building creates scoring code capable of calculating a probability of "success" for the dependent variable given a specific set of independent values. These calculated probabilities may be referred to as "predictors."

In some embodiments, the primary output of model building is the scoring code to be used for predictions. The secondary output is the data used for model validation.

Assumptions and Effects

The assumption of constancy (stationarity) is made for the initial training data over its prediction period to the extent that the specified model's predictions are expected to accurately reflect the training scenario. Anything that invalidates the assumption of constancy threatens to make predictions invalid. Multiple ways of judging the assumption are used during model operations.

The initial data constitute the initial comparator against which both improvement and constancy can be measured.

There is an observer effect in all data collection mechanisms. In some embodiments, the observer effect is maintained as constant as possible across differing data collection mechanisms.

The act of embedding a model in a business process also introduces a modeling effect that results from the interference of the model in the ongoing commercial process. This modeling effect means a constant source of random inputs divided from the total commercial input stream is needed for control purposes.

Endogenous Effects

The goal of model building is to predict a 0|1 dependent variable based on a set of values for the model's independent variables. This makes the dependent variable endogenous to the management process. The assumption of constancy means the average composition of the values of the independent variable should be constant, along with their relationship to the dependent variable. Changes in the average composition of the independent variables will have potentially large positive or negative effects on the endogenous variable that may indicate lost constancy. The composition of the independent variables is exogenous to the model.

Prediction Process

The prediction process involves assimilating a coherent set of independent values and calculating its probability in an increment of time where the prediction has business value. After the increment of time, the actual outcome associated with the coherent set of independent values is known and recorded.

After operating for an arbitrary time interval, there exists some number of actual observations of the dependent variable associated with the predicted probability for each actual set of independents. This is not how the initial MDF was created. The initial MDF was created from some collection mechanism separate from the expert system. A model was built from the initial MDF, and then implemented for automated operational modeling.

The differences in collection mechanisms should be consciously managed and rationalized to maintain model efficacy.

Operational Scaling

In some embodiments, the expert system in which the model is built and used may have different operational characteristics from the training and validation system. In some embodiments, the training and validation system may be configured to run in real-time or near-real-time so predictions can be offered in time to change behavior. The expert system, on the other hand, need not be so responsive and can conceivably run from a queue with service levels in the vicinity of 2 to 6 hour turnaround times.

The expert system may be configured with large memory loading and may require interpretation so scalability is challenging. In some embodiments, one model building run per system image can be assumed for the expert system. This means horizontal scaling by virtual systems. Each system will have unique data, in general.

MDF Size and Sequence

As previously mentioned, ongoing outcomes, both random, un-modeled holdout data and modeled data are used for ongoing validation. The sequence of MDF(i) should be timed according to size minimums and seasonal factors. The lag in determining the actual outcome doesn't add significant latency to preparing the MDF.

Validation data does not have to be subject to the same size limits as modeling data as significant deviations can be detected in model efficacy before enough data to retrain a new model can be recorded and calculated.

Handling Time Series

In general, the data flowing through a business are accurately considered time series. Since the expert system is based on correlations in aggregated data, time series are not necessarily handled well.

Time series are characterized by waves (seasonality) and trends on top of a stable mean and variance for some random variable(s). Statistical regression can deal with linearized trends. The waves of seasonality cause the issues. The adjusted approach is to look at seasonality by its natural units (e.g., by weekday), and then train on weekday/weekday data constructions, if enough data exist. For example, the model is trained for next Monday on last Monday's data or the last four Mondays' data (seasonal weeks).

The modeling (beta) coefficients provide good information on the strength and directionality of independent variables. Tracking trends in the values of independent variables along with the effect in direction on dependent variable will help manage the assumption of constancy but can be manual in nature.

Measuring Fitness

Assuming a model is well calibrated with a minimum but meaningful number of significant coefficients, the model also could have discrimination and stability to predict outcomes effectively. This is known as the model's goodness-of-fit (GOF). In some embodiments, the expert system disclosed herein is superior in finding models with GOF. Specifically, the expert system may employ a gains chart to depict GOF plus several other techniques to ensure accurate calibration.

The discrimination of the scoring code's prediction is well measured by a gains chart conveying how the predicted probability separates 1's from 0's in the dependent column for the available data. Model stability can be estimated by comparing the gains of holdout data to the gains of the training data.

But ongoing measurement and estimation of GOF can benefit from slightly different techniques. Since operational modeling moves away from model training as the time semantics of the data change, the stepwise algorithms and criteria used for tight calibration can become unreliable. An automated, repeatable and ongoing test should be executed against the latest data.

A model can have high calibration by fitting the available data extremely well yet exhibit poor discrimination or have good discrimination but poor calibration. For example, consider a repeatable but random process that can be accurately modeled as purely random. The result is good calibration but poor discrimination. On the other hand, consider adding a constant to the output probability of a good model. The calibration would be off by the amount of the constant but the collating sequence of probabilities is unchanged so discrimination would be unchanged at any cut-point.

To effectively challenge the hypothesis that the model fits the data, the training and validation system measurements can capture changes in the independent variables and their relation to the dependent variable, the endogenous phenomenon being modeled, sufficient to conclude something has changed. Since the operational data that are being modeled contain a "modeler" effect, a source of unaffected data for control should be collected and evaluated continuously. Measurements and estimates can be drawn from the ongoing control data and then compared to estimates from preexisting validation data. Other comparisons to training data and operationally modeled data are also available.

The basic test approach assumes that a model that fits the data is a good model and requires estimable deviations from key statistics to reject that assumption, called the null hypothesis. Instead of relying on a fixed level of significance, one or more statistical significance testing values may be used in determining a significance level. In one embodiment, the p-value associated with the observed measurements and assumptions are reported for action. Test statistics are estimated to cover calibration and discrimination. A user-implemented decision criterion is then used to make the ultimate retraining decision.

In general, these test statistics approximate either normal (for proportions testing), or chi-square (for calibration testing) distributions. Once a test statistic is calculated for the appropriate situation, it will be converted to a p-value for a two-sided test. A one-sided test is also a possibility. The p-values can be reported within their respective contexts to the user for a decision. In the case of testing for discrimination, several p-values will be available, as described below and then input into user controlled decision criteria.

To track ongoing GOF, statistics on both calibration and discrimination for current data will be compared to the pre-existing validation (holdout) data from model building. Maintaining a chosen model is the null hypothesis, whether for calibration or discrimination. Every test of significance has a stronger conclusion with more data and a lower p-value.

Model Retraining

There are two possibilities (other than nothing) in responding to decisions taken for perceived changes in model assumptions: (1) re-calibrate the coefficients for the existing model or (2) re-specify a new model with potentially new features.

One possibility is to re-calibrate on regular intervals using a moving data horizon, such as adding a new day and dropping an old day from the training data on a daily basis, then recalibrating the coefficients for the incumbent model. The p-values can be used to decide when to re-specify an entirely new model. Re-calibrate daily and re-specify as indicated by above statistics.

A possible issue with this approach follows from the fact that far less data are needed to make a re-training decision than are needed to completely re-specify a new model. In any case, there is a strong business incentive against capturing a large fraction of random, un-modeled data. A paradox is possible where the need to re-specify is established but insufficient data for re-specification exists. Regular re-calibration could proceed until enough "new" independent data exist for re-specification. Or, operational data could be used for re-specification.

The above process will present the user with a constellation of p-values, one for calibration and several from differing cut-points for True Positive Rate (TPR) and False Positive Rate (FPR). Since the decision to retrain is binary, these p-values are converted into a yes or no decision. This is accomplished by scanning multiple rules and re-specifying the model if any rule is satisfied (or not). For example, the Chi Square statistic in a rule for calibration plus the TPR proportional differences between initial holdout scored data and ongoing random scored data at the first, third and fifth deciles, respectively, produce p-values for three rules. Each rule can have different thresholds for satisfaction.

As can be seen above, a commercial process with an important 0|1 dependent variable can be associated with a set of independent variables. The commercial process continuously provides data collection opportunities. An intervention is designed using a model to predict the dependent outcome. The actual outcome of the intervention can be determined within the window of utility for these data.

One objective is to improve intervention outcomes with prediction. Purely random outcomes (no model prediction) and outcomes resulting from the intervention (model operations) are aggregated into separate files, a sequence of control MDFs and a sequence of MDFs of operational data. These MDFs are used to analyze model performance and to react automatically when identified conditions warrant.

Continuous dependent variables potentially need other treatment as well as survival, clustering/CF and tree classification situations.

The present disclosure will be further understood from the drawings and the following detailed description. Although this description sets forth specific details, it is understood that certain embodiments of the invention may be practiced without these specific details. It is also understood that in some instances, well-known circuits, components and techniques have not been shown in detail in order to avoid obscuring the understanding of the invention.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Figure 1:
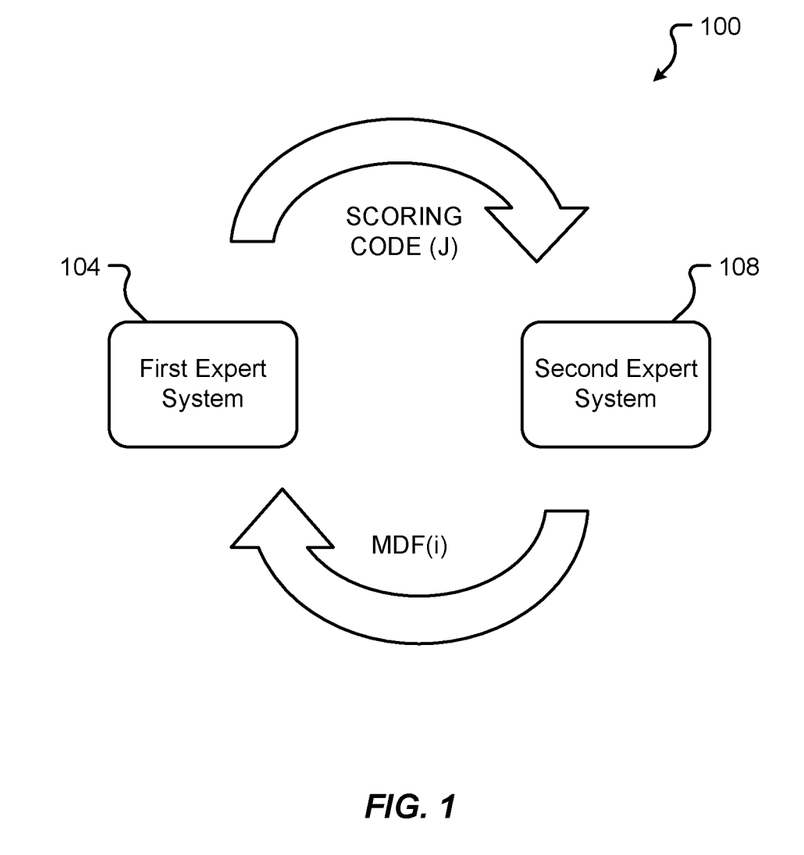
FIG. 1 is a system diagram depicting interactions between an expert system and a testing and validation system in accordance with embodiments of the present disclosure.

Referring initially to FIG. 1, a system 100 is depicted as including a first expert system 104 and a second expert system 108. The system 100, in accordance with at least some embodiments, may correspond to a business analytics system and may be deployed on one or more local enterprise servers, via a web-based architecture (e.g., as Software as a Service (SaaS), as a cloud-based service, etc.), via cluster computing, or via any other known architecture. In other words, the expert systems 104, 108 may correspond to systems comprising one or more servers, computers with processors and memory, virtual machines, FPGAs, ASICs, or combinations thereof.

One or both of the expert system 104, 108 may correspond to any computer or computer system that emulates the decision-making ability of a human expert. Expert systems are designed to solve complex problems by reasoning about knowledge, like an expert, and not by following a procedure of a developer. Examples of expert system include, without limitation, GainSmarts® data mining system, SAS® Enterprise Miner™, IBM's SPSS Clementine®, and the like. Any one or combination of these systems or any other type of known or yet to be developed expert system can be used in accordance with embodiments of the present disclosure.

In some embodiments, the first expert system 104 is loosely coupled to the second expert system 108. As an example, the first expert system 104 may correspond to a system in which models are built and deployed while the second expert system 108 may correspond to a system in which models are made operational and are continually tested and/or verified. As a more specific example, the second expert system 108 may correspond to a system that applies predictive models to ongoing commerce that is occurring at the first expert system 104. The second expert system 108 may be configured to continuously test the models being deployed in the first expert system 104 for stationarity and/or stability. In some embodiments, responsive interactions between the expert systems 104, 108 depend upon data exchanges that are timely, accurate, and of sufficient size for automated operational modeling to succeed. Specifically, the first expert system 104 may be configured to generate and provide scoring code (J) to the second expert system 108 while the second expert system 108 may be used to manage GOF for the model(s) built in the first expert system 104.

The second expert system 108 may be structured such that a model built with initial data in the first expert system 104 is reiteratively retrained when significant deviations from the original training and/or validation model are measured in ongoing operations. Accordingly, the second expert system 108 may be provided with the capability to capture actual user outcomes continuously from the first expert system. Details of the interactions between the expert systems 104, 108 are depicted in FIG. 2.

FIGS. 2-8 depict further details of an analytics system, an analytics platform, and components thereof. It should be appreciated that some or all of the elements depicted in FIGS. 2-8 may be used to implement some or all of the disclosed functions and features.

Figure 2:
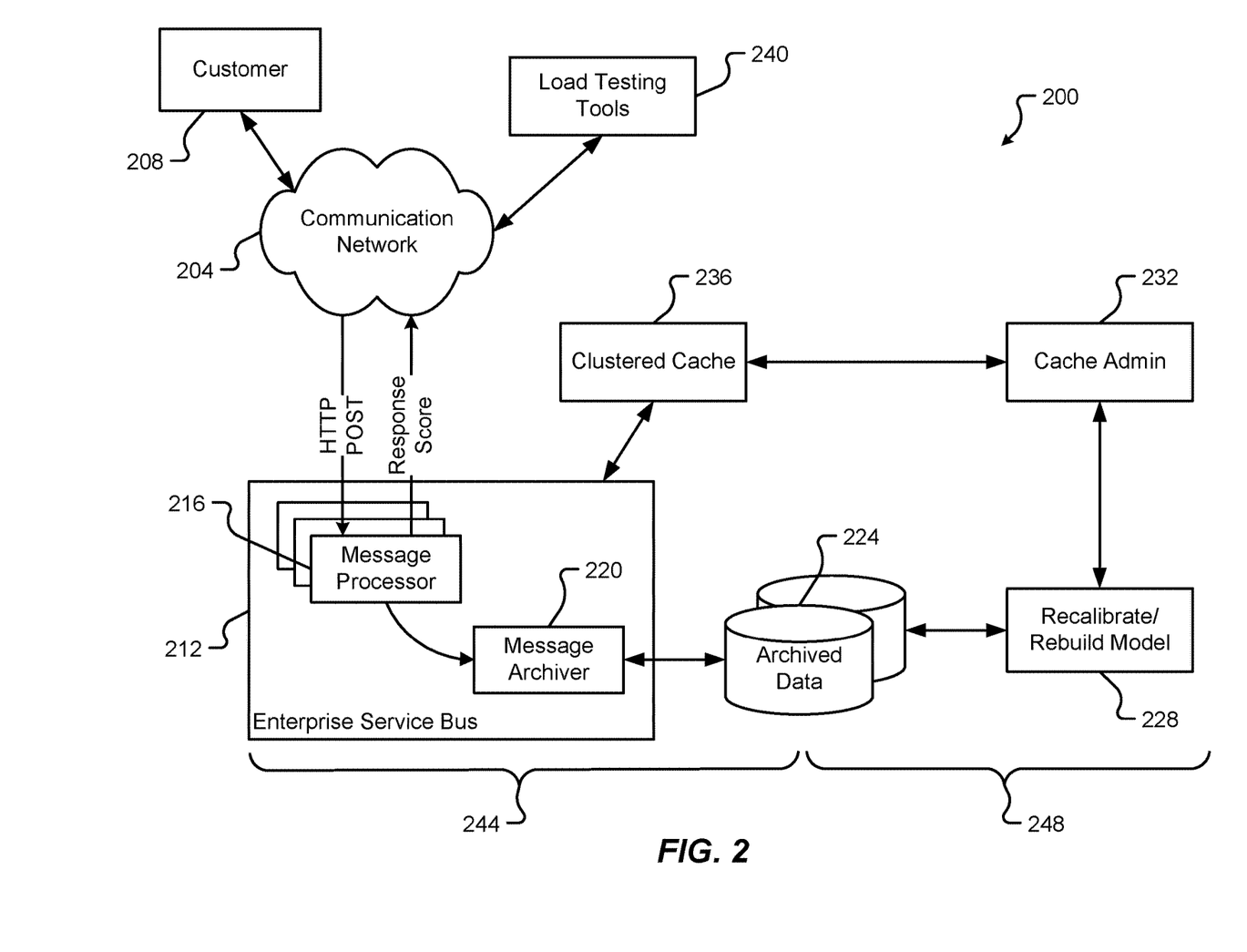
FIG. 2 is a detailed system diagram depicting an expert system in accordance with embodiments of the present disclosure.

FIG. 2 shows a detailed system diagram depicting an expert system 200 in accordance with embodiments of the present disclosure. As shown, the expert system 200 may join one or more customers 208 with the system 200 over a communication network 204. In accordance with at least some embodiments of the present disclosure, the communication network 204 may comprise any type of known communication medium or collection of communication media and may use any type of protocols to transport messages between endpoints. The communication network 204 may include wired and/or wireless communication technologies. The Internet is an example of the communication network that constitutes an Internet Protocol (IP) network consisting of many computers, computing networks, and other communication devices located all over the world, which are connected through many telephone systems and other means. Other examples of the communication network 204 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 204 need not be limited to any one network type, and instead may be comprised of a number of different networks and/or network types. Although several examples provided herein may depict a hyper text transfer protocol (HTTP) application level interface, other forms of application level interface may be used. For instance, technologies such as messaging, queues, and/or peer-to-peer may equally apply, to name a few.

In some embodiments, the core functionality of the expert system 200 may be used across one or more customers 208. Additionally or alternatively, the system 200 can track and score visitor traffic. The system 200 may categorize each uniform resource locator (URL) and capture hits/category, time/category, and combinations thereof. In one embodiment, the system 200 may track and score category position in a data stream. This data stream can include, but is not limited to, text, video, file, multimedia, combinations thereof, and the like. As can be appreciated, the system 200 is extensible and may determine signaling with any external system.

An enterprise service bus 212, in communication with one or more customers 208 via the communication network 204, may include message processors 216 and a message archiver 224. In some embodiments, the message processor 216 may be used to control how messages are sent and received within a message flow. Typically, the message processor 216 is configured to handle messages by applying business logic to a given message and routing the message to an appropriate application. In some cases, a message archiver 220 may be employed to optimize server load, by moving messages from the server to the message archiver 220. In other words, the efficiency of servers, especially in Big Data applications, is paramount to optimal system performance characteristics. As such, message archiver 220 may be used to move traffic from a server to the message archiver 220. In some cases, the message archiver 220 may scan for duplicate data and even act to remove redundant data from the system. The message archiver 220 may store the data in an archived data 224 storage location. This archived data 224 may be compressed prior to storage.

In some embodiments, an MDF may be generated on a periodic basis or on the fly. As an MDF is used in daily/periodic processing 248, the file can be updated to account for changes detected in the system. For example, as data is being scored in real-time 244, the MDF may be caused to recalibrate and/or rebuild based on how close the score is to predicted values of constancy. In other words, the automated scoring used by the system 200 may allow for the calibration, validation, and even updating of the MDF. Via the cache admin 232 the system 200 may determine one or more instances of matching content through use of the clustered cache 236. By way of example, the clustered cache 236 may be used to store results and/or scoring associated with the MDF.

It is an aspect of the present disclosure that load testing tools 240 may be in communication with one or more components of the system 200. Among other things, the load testing tools 240 may submit the system 200 to traffic and other performance tests, including but not limited to simulated workloads. In some embodiments, the load testing tools 240 may be employed to test the software and/or system performance and can even be configured to measure response times under simulated traffic and/or loads.

Figure 3:
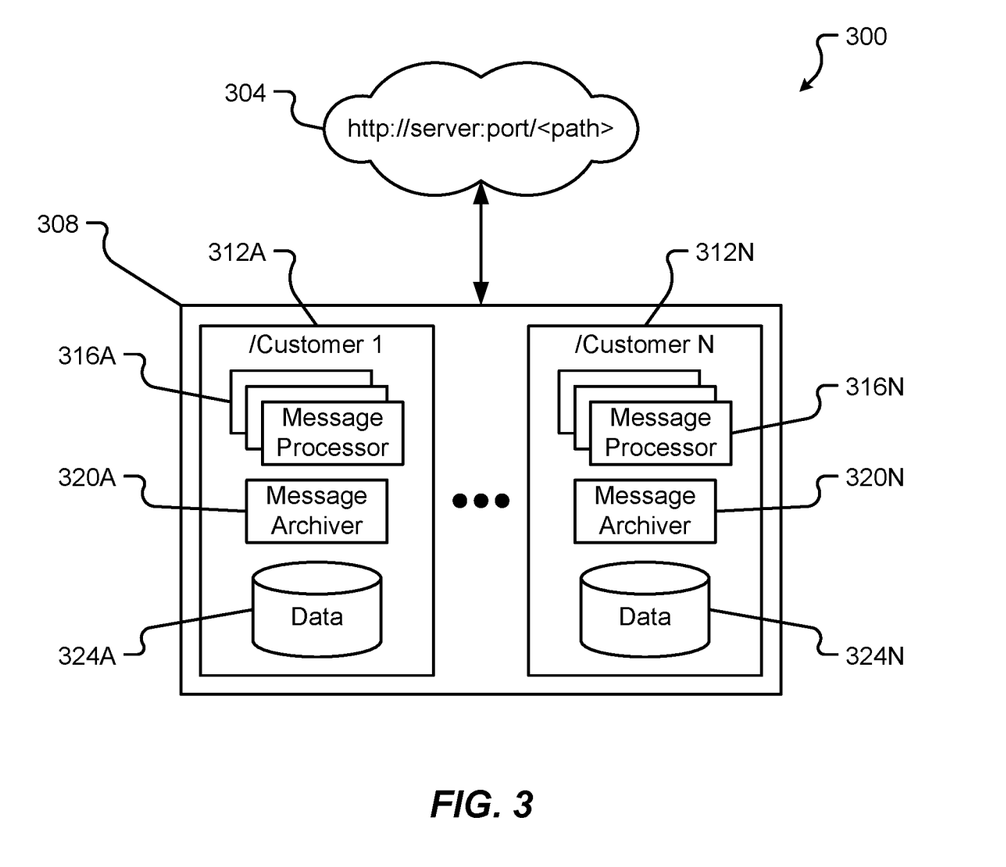
FIG. 3 is a block diagram of customer data instances in communication with an expert system in accordance with embodiments of the present disclosure.

Referring now to FIG. 3, a block diagram of customer data sources in communication with an expert system is shown in accordance with embodiments of the present disclosure. As shown, customer instances 312A-N may be grouped together to run as a cluster 308. In some embodiments, customer instances 312A-N may include, but are in no way limited to, message processors 316A-N, message archivers 320A-N, and message data 324A-N. The function of each of these components may be similar, or identical to, the description previously provided for message processors, archivers, and archived data in reference to FIG. 2. It is an aspect of the present disclosure that the cluster 308 may include one or more customer instances 312A-N. One example of utilizing the clustered customer instances 312A-N can include the benefit of allowing an application to run on parallel servers.

Figure 4:
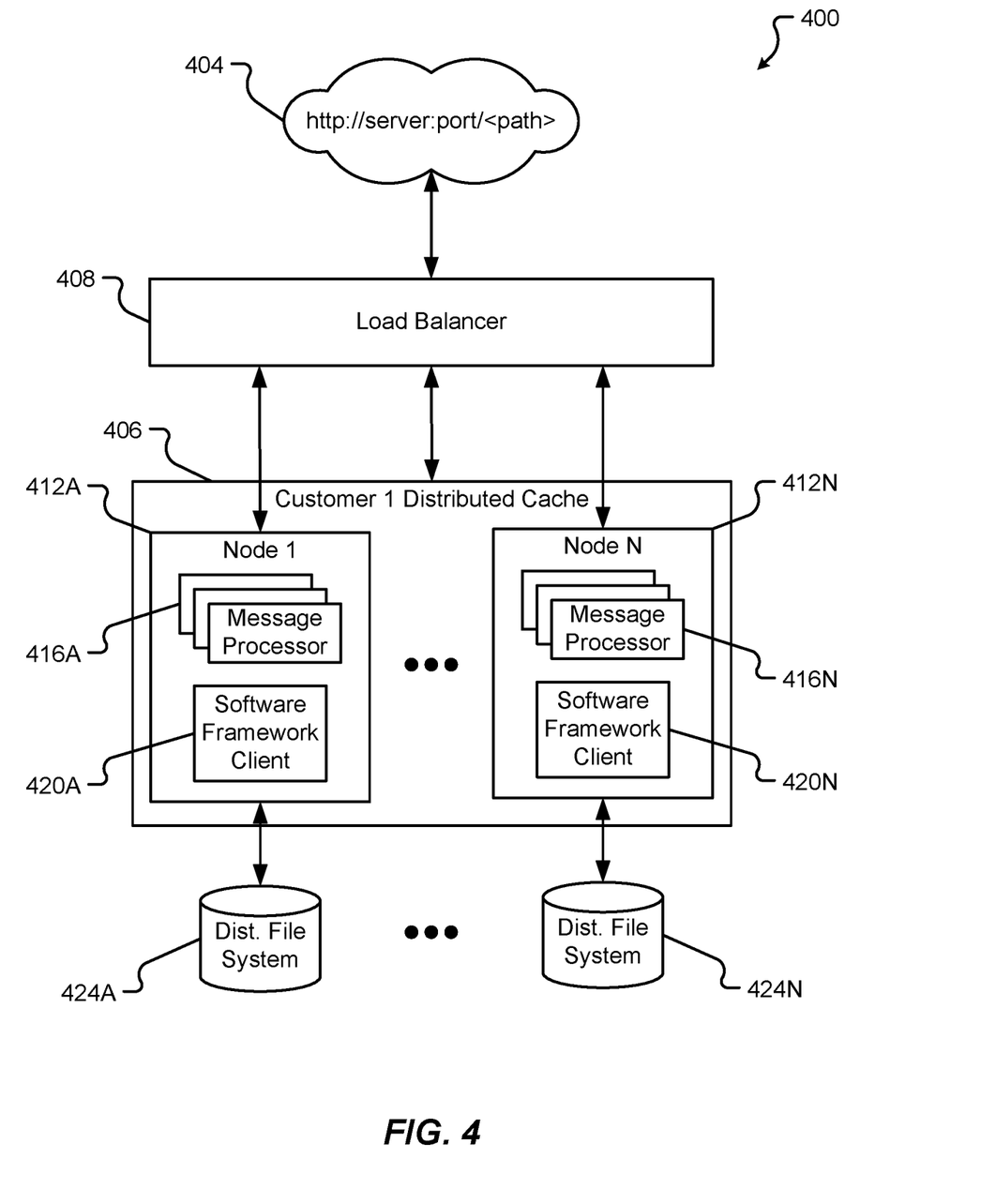
FIG. 4 is a block diagram of nodes associated with a customer data instance in accordance with embodiments of the present disclosure.

FIG. 4 depicts a block diagram of nodes associated with a customer data instance in accordance with embodiments of the present disclosure. One or more nodes 412A-N are shown in a cluster 406. Utilizing clustering can allow applications to run on parallel servers, and as such, the load may be distributed across different servers. In addition to offering capability redundancy in the event that a single server of the parallel servers fails, performance can be improved by adding more nodes to each cluster 406.

In some embodiments, each node 412A-N may include a message processor 416A-N, a software framework client 420A-N, and a software framework client distributed file system, or file system, 424A-N. The message processor 416A-N may be used to control how messages are sent and received within a message flow. As such, each message processor 416A-N can be configured to handle messages by applying business logic to a given message and routing the message to an appropriate application. The software framework client 420A-N may be used to support running applications on large clusters of hardware. Additionally or alternatively, the software framework client 420A-N may be configured to support data-intensive distributed applications. In some embodiments, the file system 424A-N may include, but is not limited to a distributed, scalable, and portable file system written for the software framework client 420A-N.

In one embodiment, a load balancer 408 may be employed to process all requests and dispatch them to server nodes 412A-N in the cluster 406. As can be appreciated, the load balancer 408 may be used to handle requests sent via a web browser client. The client web browser may use policies associated with the load balancer 408 to determine which node will receive a particular request from the web browser.

Figure 5:
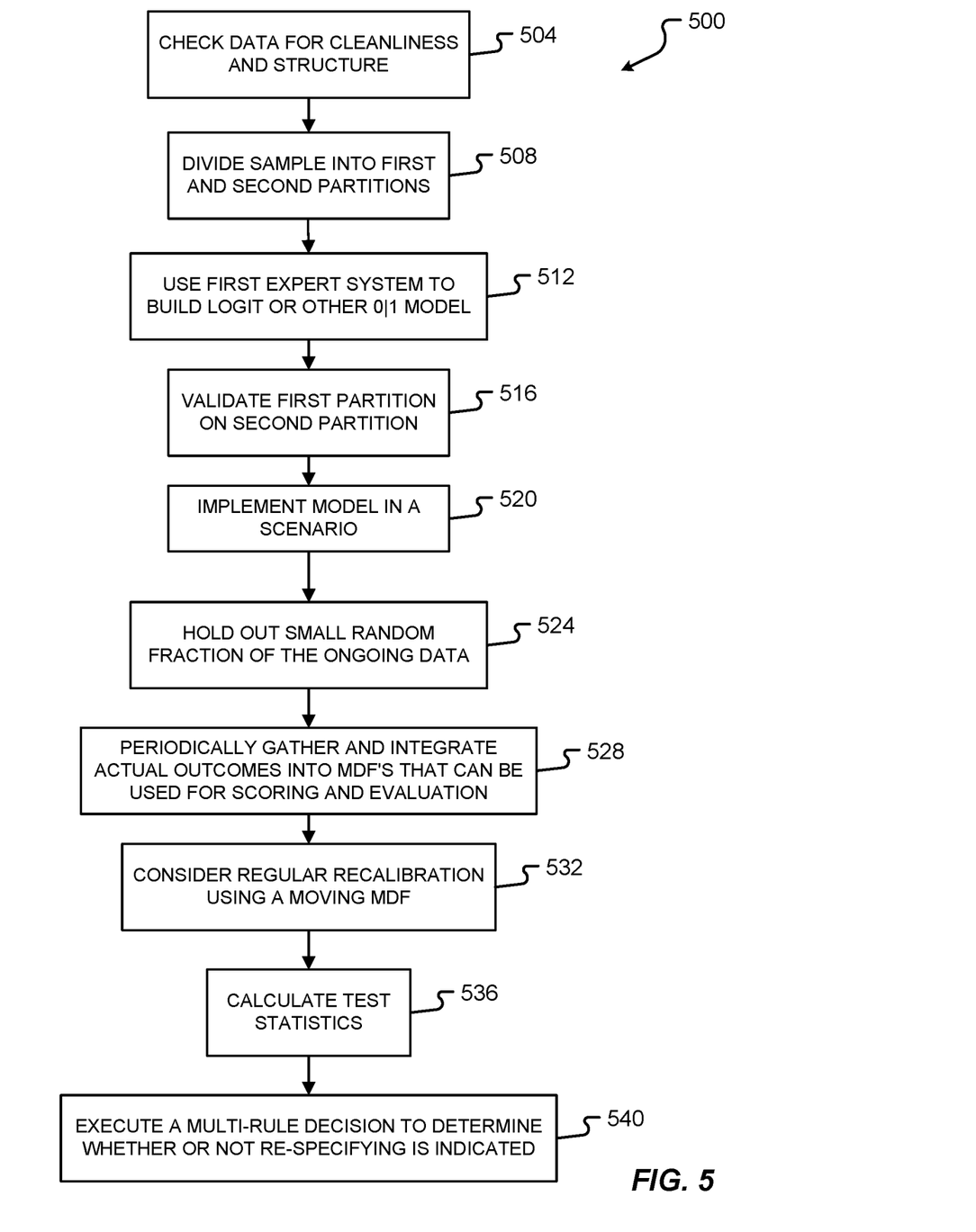
FIG. 5 is a flow diagram depicting a method of automatically testing and validating an operational model in accordance with embodiments of the present disclosure.

FIG. 5 depicts one example of a model retraining process in accordance with at least some embodiments of the present disclosure. The method begins by checking the data of an MDF for cleanliness and structure (step 504). This particular step may be performed in the first expert system 104, the second expert system 108, or combinations thereof.

A sample of the data may then be randomly obtained and partitioned into at least two portions (step 508). In some embodiments, the random sample of data may be randomly divided into ⅓rd and ⅔rd partitions.

Thereafter, the first expert system 104 (or one of several other regression systems) may be used to build a logit or other 0|1 model from the ⅔rd partition (step 512) and validate on the ⅓rd partition (step 516).

The model may then be implemented in a scenario with a congruent data flow in such a way that commerce can be influenced by a prediction on a 0|1 dependency in the data (step 520). During implementation of the model in the first expert system 104, a small random fraction of the ongoing data may be held out such that the held ongoing data can be provided to the second expert system 108 (step 524).

As the model continues to be implemented, actual outcomes may be periodically gathered and integrated into MDF's (modeled and random) such that the actual outcomes can be used for scoring and evaluation (step 528).

The second expert system 108 may then consider regular recalibration (without any tests) using a moving MDF (step 532). Test statistics may then be calculated for calibration and discrimination (step 536). As a specific but non-limiting example, ten pairs of proportions may be calculated at each decile for both TPR and FPR and these pairs of proportions may be used for discrimination.

Based on the calculated test statistics, a multi-rule decision criterion may be used to determine whether or not re-specifying is indicated (step 540).

Figure 6:
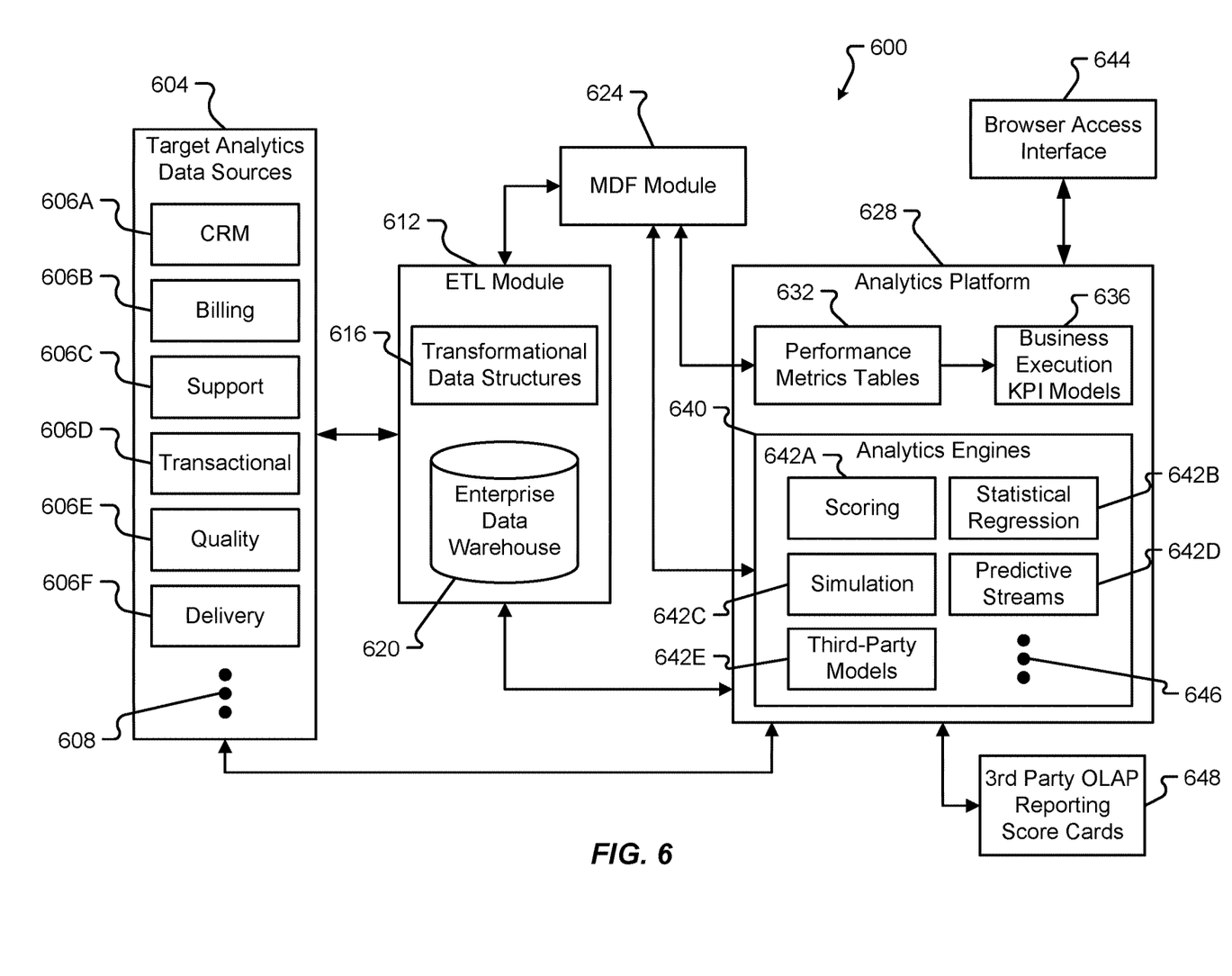
FIG. 6 is a diagram depicting an analytics platform system in accordance with embodiments of the present disclosure.

FIG. 6 is a diagram depicting an analytics platform system 600 in accordance with embodiments of the present disclosure. In some embodiments, the creation of an MDF includes receiving data from one or more target analytics data sources 604. The data sources 604 may include, but is in no way limited to, data from customer relationship management 606A, billing 606B, support 606C, transactional 606D, quality 606E, delivery 606F, and more 608. The analytics platform system 600 may employ an extract, transform, and load (ETL) module 612 to incorporate and normalize data from the data sources 604. Among other things, the ETL module 612 may be configured to join data values from the various sources 606A-F, aggregate values, and even aggregate counts across various periods (e.g., time periods, etc.).

In some embodiments, the ETL module 612 may employ the use of specific transformational data structures 616. The transformational data structures 616 can include rules and/or functions that are applied to data received by the ETL module 612. For instance, the transformational data structures 616 can be applied to determine and even prepare the data for storage in the enterprise data warehouse 620. Although some data may require multiple transformations before it is stored, it is anticipated that other data may require minimal or even no transformations before it is directed to an end target or enterprise data warehouse 620. Non-limiting examples of the transformations performed via the transformation data structures 616 of the ETL module 612 may include one or more of, joining data from multiple sources (e.g., target analytics data sources 604, etc.), aggregation (e.g., summing multiple data rows, summing values, etc.), encoding values, deriving new values, sorting, and the like.

Once the data has been received, extracted, and in some cases transformed, the data may be loaded into the enterprise data warehouse 620. The enterprise data warehouse 620 may be configured to store data, in a historical form, overwrite old data, and/or combinations thereof. As such, the data in the enterprise data warehouse 620 may update stored data periodically, as required. In one example, data extracted from one or more of the data sources 604 can be used to define a particular business person at a company. Although various departments at the company may identify the business person in different manners, and even by different metrics, the data stored in the enterprise data warehouse, can be arranged to present all of the identifying characteristics in a uniform manner. Among other things, the uniform presentation manner can allow the business person to be identified by any department by referring to the stored data in the enterprise data warehouse 620.

The MDF module 624 may periodically interact with the ETL module 612 and/or its various components 616, 620. This periodic interaction may range from continual monitoring to specific timed, pseudo-random, or random, monitoring time periods. Additionally or alternatively, the interaction by the MDF module 624 may be dynamic in nature, and as such, can be configured to detect and react quickly to data targets and predictors that are contained within the data. In some embodiments, the MDF module 624 may be a part of the analytics platform 628 or share its monitoring functionality with one or more components of the analytics platform 628. In one embodiment, the MDF module may be located separately and apart from the analytics platform 628.

In some embodiments, the analytics platform 628 may include one or more analytics engines 640. The analytics engines may include, but are not limited to, expressions language, simulation and forecasting components, scoring 642A, statistical regression 642B, simulation 642C, predictive streams 642D, third-party models 642E, and more engines 646. It is an aspect of the present disclosure that the analytics platform 628 may communicate with one or more of, the target analytics data sources 604, the ETL module 612, the MDF module 624, browser access interfaces 644, third-party online analytical processing (OLAP) modules 648, and/or the various subcomponents that make up each of these components.

It is an aspect of the present disclosure that the analytics platform 628 may be configured to generate and/or refine MDFs used in the analysis of data. The analytics platform 628 may access the data sources 604 and ETL module 612 in modifying, creating, and/or determining an effectiveness of MDFs. In some embodiments, the efficacy of an MDF may be evaluated based on metrics stored in performance metrics tables 632 and business execution key performance indicator (KPI) models 636. In the event that unexpected or outlying values are detected, whether via components of the analytics platform 628 or via third-party OLAP reporting, or in the event that scoring of the MDFs is found to yield low scoring results, the analytics platform 628 may update one or more MDFs to rebuild, retrain, or re-specify the files. As provided herein and above, updating MDFs may be performed dynamically and continually as required to at least yield stationarity in measured and predictive analytics.

In some cases, the system 600 may allow an end-user or client the ability to monitor, search, view, and even manage data via a browser access interface 644. The browser access interface 644 may be built upon one or more computer programming language platforms (e.g., Java®, etc.) to provide a web-based front end to data collections via the analytics platform 628.

Figure 7:
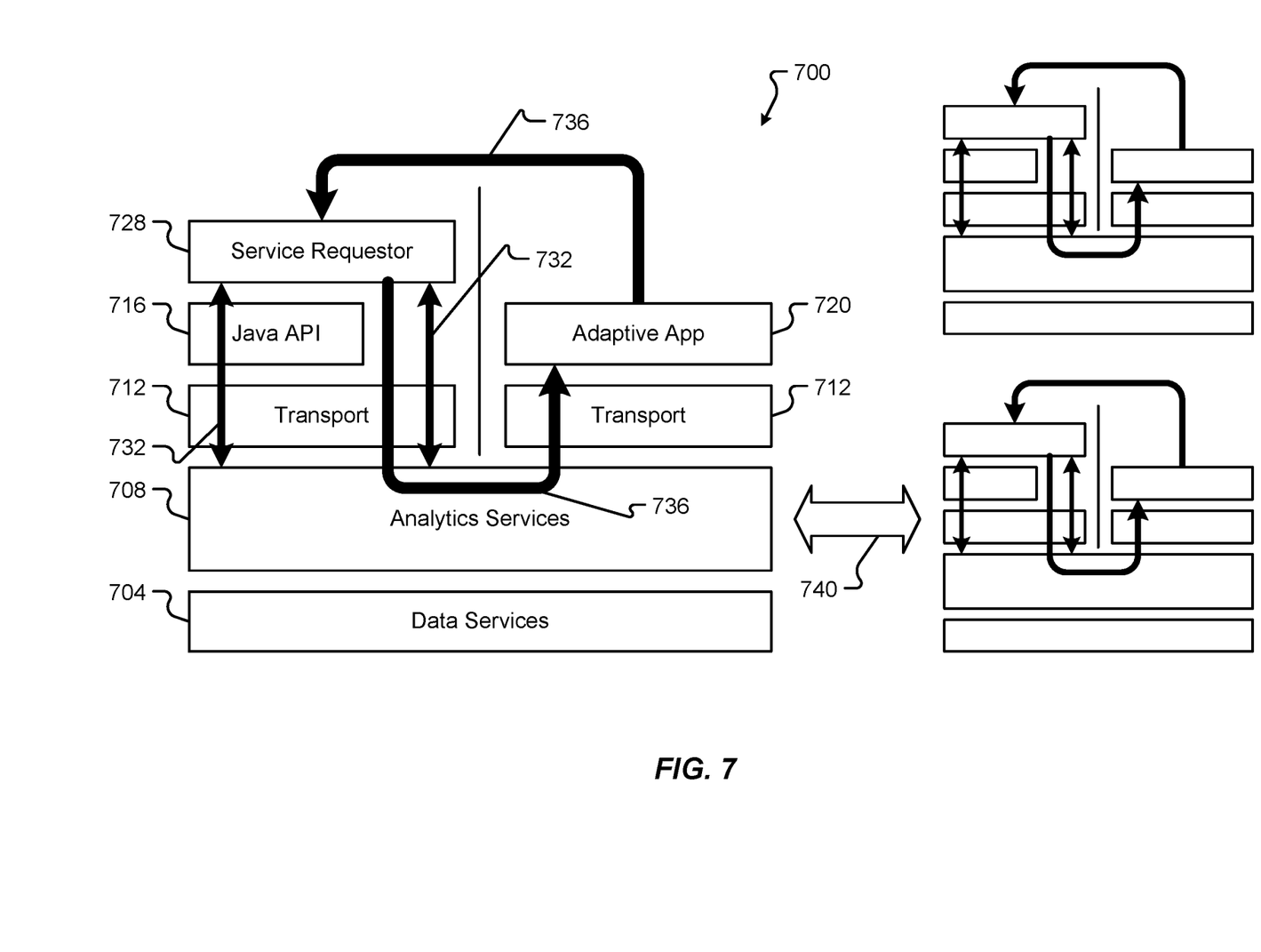
FIG. 7 is a services architecture in accordance with embodiments of the present disclosure.

Referring to FIG. 7, a services architecture 700 and hierarchy is shown in accordance with embodiments of the present disclosure. Among other things, the services architecture 700 can serve as a conceptual framework that characterizes and standardizes the functions of the analytical system as logical layers. The first logical layer is representative of data services 704, which can be associated with one or more data sources 604 as described above. The second logical layer is representative of analytics services 708 and may be configured to store, generate, and even modify MDFs, as disclosed herein. The transport layer 712, acting as the third logical layer in the services architecture 700, may be configured to provide source to destination delivery of messages and/or data. Additionally or alternatively, the transport layer 712 may be responsible for flow and error control of data in the system. Typical transports may include hyper text transfer protocol (HTTP) or secure HTTP (HTTPS) for web-based applications. In some cases, the transports may incorporate secure shell (SSH) cryptographic network protocol to integrate event handlers.

In some embodiments, the applications layer of the architecture 700 may include one or more application programming interface(s) (API) 716, adaptive applications 720, and the like. The API 716 can be configured for a specific computer programming language, such as Oracle's® Java® programming language. Among other things, the API 716 can provide for session and native data semantics. The adaptive applications 720 may include those applications that are embedded into a business environment. In some cases, the applications may be embedded via one or more of, enhanced expressions analytics language, data wrapped into a signal message, and integrated via at least one computer programming language adapter. It is an aspect of the present disclosure that other applications (e.g., parent applications, etc.) may stream data to the adapted application 720.

In one embodiment, the service requestor 728 may act to initiate and/or respond to event requests 736. As shown in FIG. 7, the request response 732 is shown as flowing from the service requestor through the analytics services 708. Event requests 736 can be initiated via the service requestor through analytics services 708 and to an adaptive application 720. In some embodiments, the adaptive application 720 may submit an event request 736 to the service requestor 728 directly. The services architecture 700 may be distributed 740 for further monitoring and management.

Figure 8:
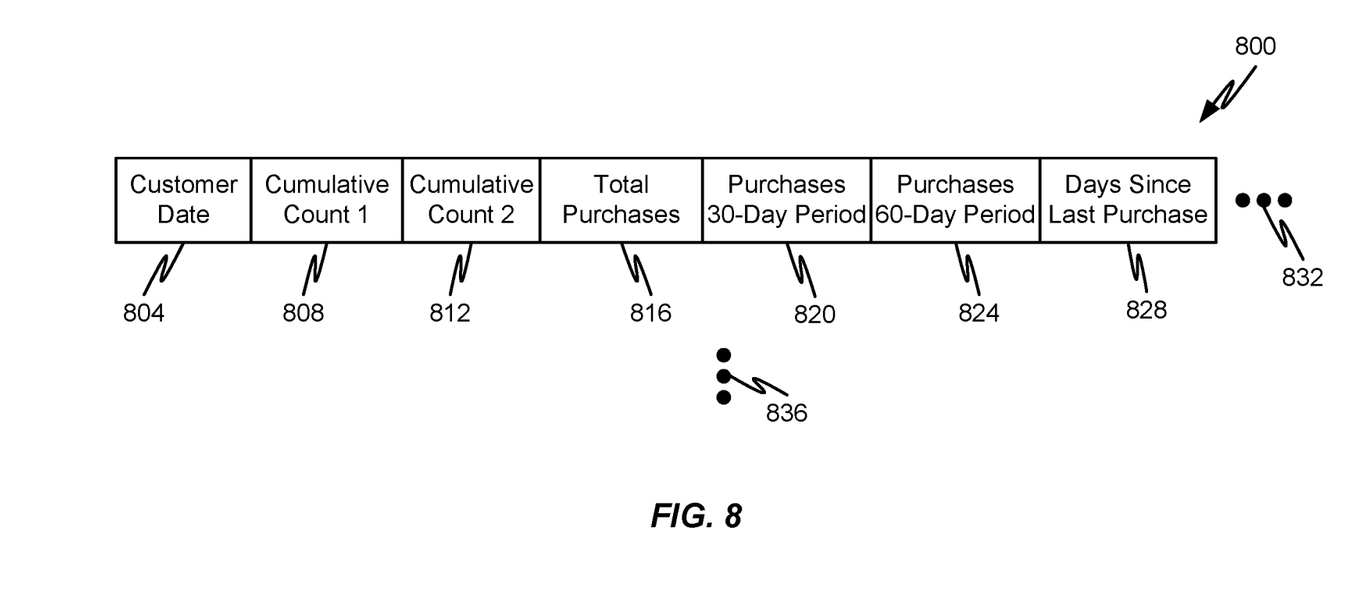
FIG. 8 is an exemplary data structure row in accordance with embodiments of the present disclosure.

FIG. 8 is a block diagram depicting an exemplary data structure 800 row used in accordance with embodiments of the present disclosure. Specifically, the data structure 800 is shown as a single row which represents combined data for an entity. In this example, the entity may be a customer of a particular service or business. As such, the corresponding data structure 800 may include a customer date field 804, first cumulative count field 808, second cumulative count field 812, total purchases field 816, purchases in a 30-day period field, purchases in a 60-day period field, days since last purchase field, and more fields 828 representing values that may be used in analytics. Although the data structure represents data associated with an entity in a single row, is should be appreciated that other rows 836 may be created to represent other entities.

In the example above, the customer date field 804 may comprise data that identifies the date the entity became a customer of the service or business. This field 804 may be used by the analytics platform 628 in creating and/or refining an MDF. In some cases, the analytics platform 628 may utilize the data contained in the field 804 to populate other fields of the data structure 800. Additionally, or alternatively, the customer date field 804 may include data used to order the entity and row among a series of rows in analytics processing.

The first and second cumulative count fields 808, 812 may comprise data that has been summed and counted within a particular context. In some cases, as data is extracted and transformed, it may be stored in one or more of the data fields in the data structure 800. The MDF can define the creation of the data fields disclosed herein. Additionally or alternatively, the MDF may determine that joined sets of data can be represented as a single data field in the data structure 800. For example, the cumulative count fields 808, 812 can include data that changes over time or is modified in result to a cumulative change to source data. The cumulative count fields 808, 812 may include data combined from other data fields of the data structure 800.

The total purchases data field 816 may comprise data that is taken directly from one or more data sources 604 or data that has been transformed via the ETL module 612. In the present example, the field 816 may represent the total number of purchases the entity has made since the entity became a customer. In some cases, the MDF may determine that valuable analytics information can be associated with purchases made by an entity over certain time periods. For instance, the MDF may determine to add a 30-day purchases data field 820, a 60-day purchases data field 824, and even more depending on the specific results desired. Using this data, an anticipated timeline of customer behavior may be mapped for one or more entities. Among other things, this mapped behavior can be used to predict trends, determine worth, and enhance focus of strategic advertising.

The days since last purchase data field 828 may comprise data related to an entity's purchase behavior. Specifically, the field 828 may be used to track the time that has passed since the entity made a purchase. Similar to the other data fields of the data structure 800, this data may be extracted from one or more data sources 604, generated via a transformation of extracted data, or created via implementation of an MDF pulling information from one or more of the data fields associated with the data structure 800. The data field 828 may provide useful tracking data based on recent purchases made. In one implementation, the analytics platform 628 may include or exclude an entity in various calculations based on recency, or relevant time assessment. Additionally or alternatively, one or more values and/or data fields associated with an entity may be included or excluded in modifying, refining, and/or generating an MDF. In the present example, recency and relevancy may be determined by referring to the days since last purchase field 828 of the data structure 800.

In the foregoing description, for the purposes of illustration, methods were described in a particular order. It should be appreciated that in alternate embodiments, the methods and steps thereof may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, SIMs, SAMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. An operational intelligence platform, comprising:
a first expert system comprising a processor and a memory coupled with and readable by the processor of the first expert system and storing therein a set of instructions which, when executed by the processor of the first expert system, causes the processor of the first expert system to use a model in connection with providing analytics data to one or more interested parties; and
a second expert system communicatively coupled with the first expert system, the second expert system comprising a processor and a memory coupled with and readable by the processor of the second expert system and storing therein a set of instructions which, when executed by the processor of the second expert system, causes the processor of the second expert system to provide the model to the first expert system and periodically test and validate the model based on changes in one or more independent variables and their relation to one or more dependent variables, wherein the second expert system applies predictive models to ongoing commerce that is occurring in the first expert system, wherein the first expert system generates and provides a scoring code to the second expert system while the second expert system is used to manage a Goodness-of-Fit (GOF) for models used in the first expert system, wherein the second expert system provides a model data file to the first expert system, wherein the model data file defines the model used by the first expert system, wherein the second expert system periodically recalibrates coefficients for the model at predetermined intervals and re-specifies the model based on how close the scoring code is to predicted values of constancy, wherein re-specifying the model data file comprises generating a new model data file, and wherein the second expert system provides the new model data file to the first expert system to replace the model used by the first expert system.

2. The platform of claim 1, wherein the second expert system is configured to obtain an independent source of random data to account for a modeler effect during the testing and validation of the model.

3. The platform of claim 1, wherein the second expert system is configured to test and validate the model at least on a daily basis.

4. A method, comprising:
deploying a first expert system to use a model in connection with providing analytics data to one or more interested parties; and
deploying a second expert system communicatively coupled with the first expert system and configured to provide the model to the first expert system and periodically test and validate the model based on changes in one or more independent variables and their relation to one or more dependent variables, wherein the second expert system applies predictive models to ongoing commerce that is occurring in the first expert system, wherein the first expert system generates and provides a scoring code to the second expert system while the second expert system is used to manage a Goodness-of-Fit (GOF) for models used in the first expert system, wherein the second expert system provides a model data file to the first expert system, wherein the model data file defines the model used by the first expert system, wherein the second expert system periodically recalibrates coefficients for the model at predetermined intervals and re-specifies the model based on how close the scoring code is to predicted values of constancy, wherein re-specifying the model data file comprises generating a new model data file, and wherein the second expert system provides the new model data file to the first expert system to replace the model used by the first expert system.

5. The method of claim 4, wherein the second expert system is configured to obtain an independent source of random data to account for a modeler effect during the testing and validation of the model.

6. The method of claim 4, wherein the second expert system is configured to test and validate the model at least on a daily basis.

7. A learning system, comprising:
an expert system comprising a processor and a memory coupled with and readably be the memory and storing therein a set of instructions which, when executed by the processor, causes the processor to provide a model used by another expert system in connection with providing analytics data to one or more interested parties, wherein the expert system periodically tests and validates the model based on changes in one or more independent variables and their relation to one or more dependent variables, wherein the second expert system applies predictive models to ongoing commerce that is occurring in the first expert system, wherein the first expert system generates and provides a scoring code to the second expert system while the second expert system is used to manage a Goodness-of-Fit (GOF) for models used in the first expert system, wherein the second expert system provides a model data file to the first expert system, wherein the model data file defines the model used by the first expert system, wherein the second expert system periodically recalibrates coefficients for the model at predetermined intervals and re-specifies the model based on how close the scoring code is to predicted values of constancy, wherein re-specifying the model data file comprises generating a new model data file, and wherein the second expert system provides the new model data file to the first expert system to replace the model used by the first expert system.

8. The learning system of claim 7, wherein the second expert system is configured to obtain an independent source of random data to account for a modeler effect during the testing and validation of the model.

9. The learning system of claim 7, wherein the second expert system is configured to test and validate the model at least on a daily basis.

* * * * *